Patented Nov. 4, 1924.

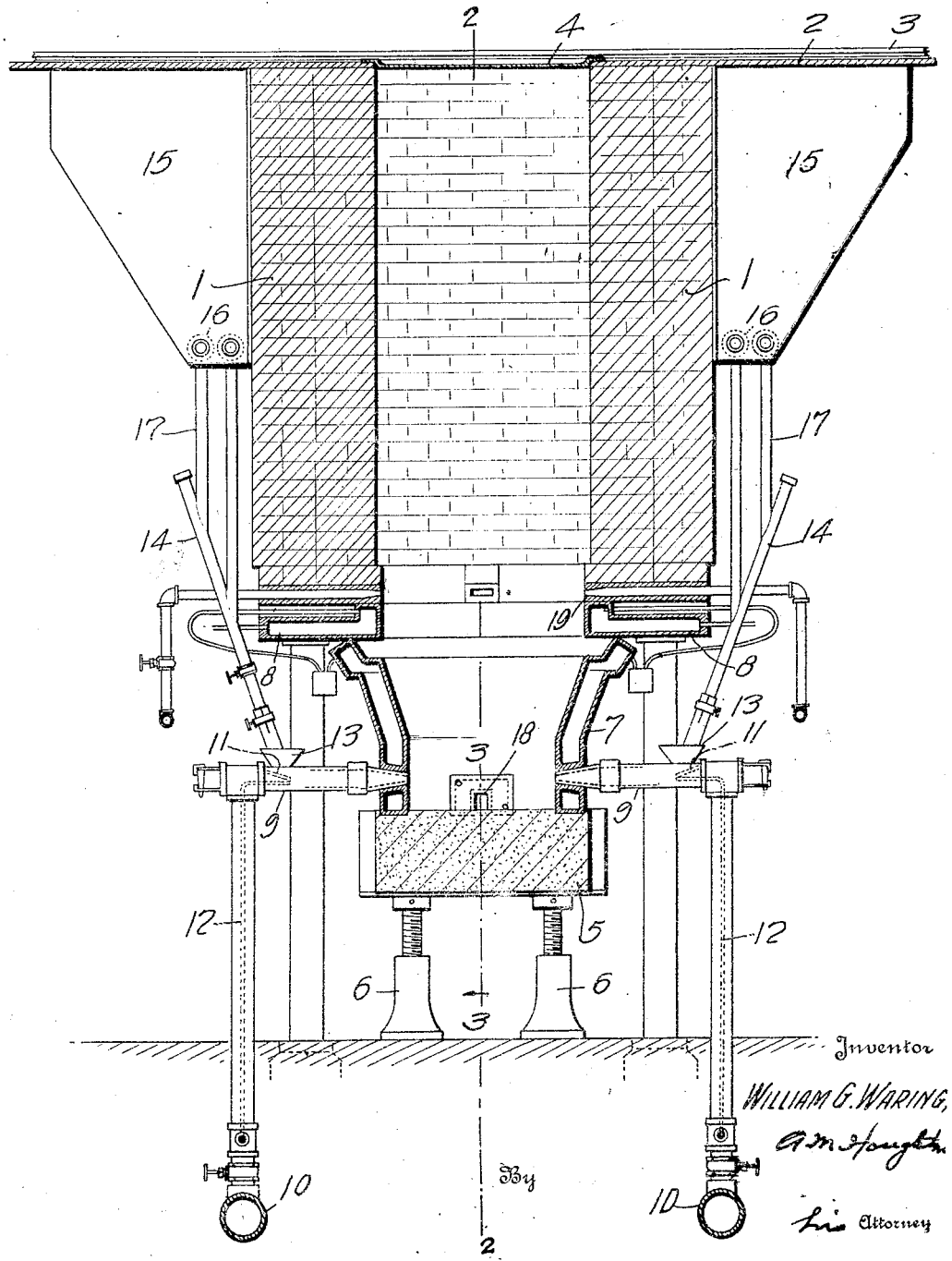

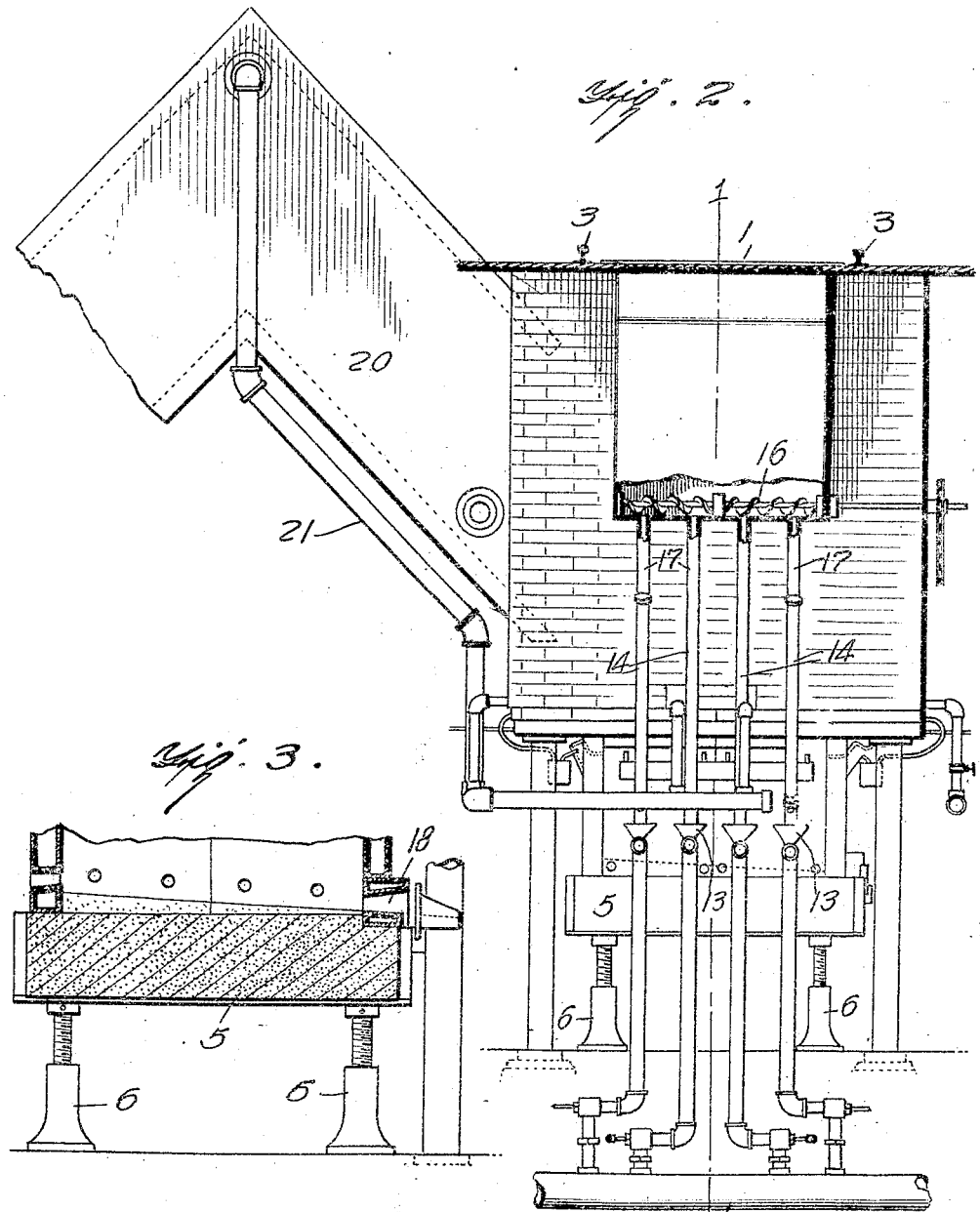

1,513,775

UNITED STATES PATENT OFFICE.

WILLIAM GEORGE WARING, OF WEBB CITY, MISSOURI.

PROCESS OF TREATING ORES.

Application filed December 26, 1922. Serial No. 609,048.

*To all whom it may concern:*

Be it known that I, WILLIAM GEORGE WARING, a citizen of the United States, residing at Webb City, in the county of Jasper and State of Missouri, have invented certain new and useful Improvements in Processes of Treating Ores, of which the following is a specification.

This invention relates to processes of treating ores; and it comprises a method of treating complex refractory ores containing relatively volatile and relatively non-volatile metals as well as non-metals, such as sulfur, arsenic, etc., such method being particularly applicable to fine ores, wherein a white-hot porous mass of fuel such as coke or coal, flux and ore is established and maintained on a suitable hearth with the aid of hot air injected in sufficient amount to maintain the temperature and a generally reducing condition, a further supply of ore fines being usually blown into such mass with the aid of high pressure air, and the vapors arising from such mass are burnt or oxidized by injected secondary air at a point above said mass, the resulting oxidized fume being subsequently collected in the usual bag filtering apparatus or otherwise separated from the accompanying gases; all as more fully hereinafter set forth and as claimed.

Ores containing lead and zinc as sulfids, with these metals constituting the main or only values, are often treated by a special process to regain these metals as "sublimed white lead;" the ore with more or less fuel being heated with an ample supply of air in low shaft furnaces having an open breast (the "Scotch hearth" type) or in grate furnaces. Lead and zinc compounds are thereby evolved as fume which is caught in bags. The product being intended for pigmentary purposes must of course be pure white; and for this reason the process is not adapted to all ores and many precautions must be taken to secure and preserve the purity of the product. Frequently a double operation is practiced; the ore being first smelted under reducing conditions to make a "blue fume" this fume being burned and the burnt fume resmelted to produce a white fume or pigment. It is customary to operate at a temperature below that at which silicate slags will form and liquefy; hence the extraction of values is incomplete. Fine or dustlike ore is not readily handled and is also avoided because of its liability to go forward with the fume. In still other processes, ores are smelted to matte and pig metal in shaft furnaces of the usual type with an incidental production of more or less fume containing lead and zinc (cadmium, bismuth, gallium, indium, thallium, etc.), as well as, usually, some silver where that metal is present in the ore. Production of fume is usually an undesired accompaniment of the operation. Other metals, such as copper, gold and silver, as well as iron are collected in the fused matte and pig metal which flow out from the hearth or crucible and are tapped off from time to time. In this process ore fines are not desirable since they choke the draft, go forward with the fume and seriously interfere with the careful adjustment of smelting conditions. Zinc is an undesirable element in ores to be treated for matte or lead smelting because its vapors condense in the upper, cooler part of the charge, clogging the fuel, etc.

In the present invention, I have devised a method of beneficiating complex sulfid ores containing lead and zinc which is particularly applicable to fine ore, and fine ore preparations, such as slime and flotation concentrates and to ores containing considerable proportions of fines. In this method I establish and maintain in a suitable shaft chamber a porous or pervious mass of ore, coke and flux, white-hot throughout. The ore in this charge, or some of it, may be coarse ore. The temperature of the charge is held at a point sufficiently elevated to yield a freely fluid high silica slag from the gangue minerals present and give a clean separation and removal of the valuable elements. This temperature may be between 1200° and 1500° C. and is generally around 1400° C. according to the composition of slag sought. Into the white-hot charge I injure a hot blast from tuyères, using such an amount of air as will maintain generally reducing conditions with the formation of a matte containing the relatively non-volatile metals present, copper and gold especially. Much of the silver, if present, goes forward along with vapors of zinc, lead, bismuth, antimony, etc. Above the surface of the charge I supply secondary air as hot blast from tuyères located above the normal charge level. Relatively volatile metals and sulfids as vapors are oxidized or burnt by this secondary air yielding snow-like oxide fumes. Fine ore is blown into the pervious mass through the tuyères supplying the primary air; a supply of high pressure air being used as injecting means. In its apparatus embodiment, the invention takes the form of a low shaft furnace located below a charging floor and provided with a hearth, slag and matte outlets and tuyères at a low level. Above the charge level it is provided with tuyères for secondary air. The lower tuyères, or some of them, are provided with means for injecting ore fines by means of high pressure air. The fine ore, being fed into the glowing pervious mass, cannot go forward with the gases to join the fume. All the ore portion of the charge may consist of fines so introduced, or the fine ore may furnish such a portion of such charge as circumstances may dictate. Coke or coal and flux are supplied to replenish the glowing mass by means of a suitable mechanical intermittent feeding device through a charge opening at the top of the shaft. If coarse ore is available it is supplied with the fuel and flux. The fuel is usually coke or coke "breeze" but bituminous coal may be used also. The usual fluxes are limestone or silica, according to whether the ore gangue is acidic or basic, the charge mixture being computed to yield a slag carrying 40 per cent or more of silica.

Under the conditions of the operation the zinc and lead are necessarily volatilized and with them any cadmium, bismuth, gallium, indium, thallium, etc., that may be present. The silver, or some of it, is also vaporized. Passing up to the level of the secondary tuyères the vapors are oxidized, or burnt, producing light visible oxide fume, which is readily caught and retained by bag filters. The other and relatively non-volatile valuable metals of the charge form a matte which is tapped off from the hearth continuously or intermittently as circumstances dictate. The gangue combines with the flux elements to form a clean high silica slag carrying no substantial amount of values.

The fumes formed at the oxidizing tuyère level go forward and are collected by bags or other devices, and may be treated by methods not here important to relate in detail for recovering the contained values. Being completely oxidized they are readily amenable to treatment with water and with the usual leaching solvents. For example, the fume may be treated with dilute sulfuric acid or by electrolytic cell liquor to dissolve the zinc, cadmium and silver; the silver and cadmium being subsequently removed by cementation upon metallic zinc with final deposition of the zinc by electrolysis. Or the fume may be extracted with a boiling solution of ammonium sulfate with cementation to deposit cadmium and silver and cooling to separate the zinc as basic sulfate. Reference is also made to my prior patents, Nos. 1,430,269, 1,430,270 and 1,430,271. When wet methods of extraction are used, lead and bismuth and most of the silver and antimony remain as an insoluble residue which can be easily reduced to metallic bullion. The matte produced in the furnace is treated in the usual ways to recover copper or gold or silver, if present.

The fume made by the present method and collected in bags differs materially from that made by prior processes. Its physical condition is such that it can be readily wetted by aqueous liquids, such as are used in leaching processes, rendering the stated methods of extraction easily applicable. This condition is probably due largely to the complete oxidation afforded by the use of the secondary air to burn the metallic vapors and carbon compounds; this oxidation being effected immediately after the vapors leave the surface of the incandescent charge and before their temperature has fallen below say 1000-1300°.

In the accompanying illustration, I have shown more or less diagrammatically, certain apparatus susceptible of use in the performance of the described process.

In this showing, Fig. 1 is a view in central vertical section, certain parts being shown in elevation along line 1—1 of Fig. 2;

Fig. 2 is a similar view along section line 2—2 of Fig. 1; and

Fig. 3 is a detail view along section line 3—3 of Fig. 1.

In this showing, element 1 is a low brick or masonry shaft of the general type of those known as Rachette furnaces. Above it is a charging floor 2 with rails 3 for convenient feeding of charge materials. Charge materials are introduced through an opening closed by plate 4. At its base it is provided with removable hearth 5, shown as carried on jacks 6. Below the masonry shaft is a charge zone, shown as formed by water-cooled metal elements 7 above which are water-cooled plates 8 forming the base of the shaft. Passing through element 7 are a plurality of hot blast tuyères 9 which may be water-cooled and which derive blast air from trunks 10. As shown, within these tuyères is an injector device 11 supplied with high pressure hot air through pipe 12, shown as contained within the blast pipe and concentric therewith. Beyond this injector is a sort of hopper 13 into which fine ore may be delivered from feeding conduit 14 supplied from pockets 15. As shown, there are two of these pockets mounted on two sides of the furnace and each provided with forwarding screws 16 adapted to feed material to pipes 14 which enter the beforementioned pipes 14. By the use of these devices fine ore may be sent forward with the blast air through the tuyères by the use of a modicum of high pressure air. As shown the hearth slopes somewhat to a matte and slag discharge 18. Passing through the water-of about 15 inches for this charge; but a level well above the normal charge level are tuyères 19 for supplying secondary air to oxidize or burn the metallic vapors into fume. Passing out at one side of the shaft is a fume trunk 20 leading fume and gases to cooling devices, bag filters, etc., not shown. The air used in the upper row of tuyères may be heated at the expense of the sensible heat of these fumes and gases by means of heat recuperating flues or the like and sent to the tuyères through pipe 21.

In the use of the apparatus shown, a suitable charge of ore, flux and fuel is deposited in the apparatus by removing plate 4. The level of the charge is somewhere below the top of element 7. I recommend a depth of about 15 inches for this charge; but a greater or less depth may be employed. The charge is brought to incandescence by hot air from any suitable air heating device coming through trunk 10 and passing into the charge. Zinc and lead, etc., volatilize and pass out of the charge as invisible metallic vapors which are oxidized or burnt with intense evolution of heat, into visible fume by more hot air entering through tuyères 19. The resultant fumes pass forward through fume trunk 20 to a place of collection and disposition. In starting, the charge is usually made up with coarse ore, flux, etc.,—coarse enough to allow free passage of blast through it. When the charge is established fine ore from hoppers 15 may be fed through pipes 17 and 14 and forced into the mass by injector 11. The fine ore so fed may thereafter if desirable constitute the chief source of supply for ore in the charge. Additional coarse ore may, of course, also be supplied. The non-volatile metals, copper and gold, with some silver, form a matte with the aid of the sulfur and iron always present in these complex ores and this matte is tapped out at 18. The temperatures are maintained high enough to form a clean fluid slag.

As will be noted, in the present method I am effecting a separation between relatively volatile and relatively non-volatile metals, the former being converted into vapor or gas which is then burnt into fume and collected, while the latter are converted into matte. Because of the temperature and other conditions in the charge the oxygen of the hot air blast and the carbon of the charge for the most part burn to CO, creating highly reducing conditions within the mass of the charge, while above the charge the CO and the volatilized metals, sulfids and sulfur burn with development of an intense heat which radiates down upon the relatively shallow bed of the charge, aiding materially in keeping its temperature at the high plane required to form and fuse clean high silica slags.

What I claim is:—

1. The process of treating complex refractory ores containing relatively volatile and relatively non-volatile metals as well as sulfur which comprises establishing and maintaining a relatively low charge of ore, flux and fuel at a temperature sufficient to form and fuse highly siliceous slags, supplying hot blast thereto in the amount required to form liquid matte and vapors carrying the volatile metals; burning the vapors passing away from the charge by hot air introduced at a spaced point above the charge level and collecting the oxidized fume so produced.

2. The process of treating complex refractory ores containing relatively volatile and relatively non-volatile metals as well as sulfur which comprises establishing and maintaining a relatively low charge of ore, flux and fuel at a temperature sufficient to form and fuse highly siliceous slags, supplying hot blast thereto in the amount required to form liquid matte and vapors passing away from the charge of the volatile metals, fine ore being blown into said charge by and with said air; burning the vapors by hot air introduced at a spaced point above the charge level and collecting the oxidized fume so produced.

3. In matte smelting of complex ores carrying zinc or other relatively volatile metals, the process which comprises smelting such an ore in admixture with fuel and flux as a shallow bed at matte and slag making temperatures by injected hot blasts, the blast being introduced in such amounts and in such condition as to produce liquid slag and matte and the effluent gases and vapors coming from such bed being burnt or oxidized at a spaced point thereabove by secondary air to aid in maintaining the temperature of such bed by radiant heat.

In testimony whereof, I have hereunto affixed my signature.

WILLIAM GEORGE WARING.